US010820597B2

(12) United States Patent
Ugalde Martinez et al.

(10) Patent No.: US 10,820,597 B2
(45) Date of Patent: Nov. 3, 2020

(54) PHYTOSANITARY COMPOSITION COMPRISING ESSENTIAL OILS THAT POTENTIATE ANTIFUNGAL ACTIVITY

(71) Applicant: BIOFUNGITEK, S. L., Derio (Bizkaia) (ES)

(72) Inventors: Unai Ona Ugalde Martinez, Hondarribia (ES); Ana Belen Rodriguez Urra, Donostia-San Sebastian (ES); Ainara Ubegun Lizaso, Lasarte-Oria (ES)

(73) Assignee: BIOFUNGITEK, S.L., Derio (Bizkaia) (ES)

( * ) Notice: Subject to any disclaimer, the term of this patent is extended or adjusted under 35 U.S.C. 154(b) by 0 days.

(21) Appl. No.: 16/231,731

(22) Filed: Dec. 24, 2018

(65) Prior Publication Data

US 2019/0124931 A1  May 2, 2019

Related U.S. Application Data

(60) Continuation-in-part of application No. 15/890,484, filed on Feb. 7, 2018, which is a division of application No. 13/982,181, filed as application No. PCT/ES2012/070005 on Jan. 5, 2012, now abandoned.

(30) Foreign Application Priority Data

Mar. 18, 2011  (ES) .................................. 201130390

(51) Int. Cl.
| | |
|---|---|
| *A01N 65/22* | (2009.01) |
| *A01N 65/00* | (2009.01) |
| *A01N 65/36* | (2009.01) |
| *A01N 31/08* | (2006.01) |
| *A01N 65/24* | (2009.01) |
| *A01N 59/00* | (2006.01) |
| *A01N 65/26* | (2009.01) |
| *A01N 65/28* | (2009.01) |
| *A01N 59/04* | (2006.01) |
| *A01N 59/20* | (2006.01) |
| *A01N 65/08* | (2009.01) |
| *C05G 3/60* | (2020.01) |

(52) U.S. Cl.
CPC .............. *A01N 65/22* (2013.01); *A01N 31/08* (2013.01); *A01N 59/00* (2013.01); *A01N 59/04* (2013.01); *A01N 59/20* (2013.01); *A01N 65/00* (2013.01); *A01N 65/08* (2013.01); *A01N 65/24* (2013.01); *A01N 65/26* (2013.01); *A01N 65/28* (2013.01); *A01N 65/36* (2013.01); *C05G 3/60* (2020.02)

(58) Field of Classification Search
None
See application file for complete search history.

(56) References Cited

U.S. PATENT DOCUMENTS

| | | | |
|---|---|---|---|
| 4,617,419 A | 10/1986 | Wiener et al. | |
| 4,925,655 A * | 5/1990 | Smigel ..................... | A61K 8/19 424/52 |
| 5,346,704 A | 9/1994 | Lajoie | |
| 6,291,401 B1 | 9/2001 | Dufau et al. | |
| 6,849,276 B1 | 2/2005 | Dufau et al. | |
| 6,849,576 B2 | 2/2005 | Suzuki et al. | |
| 7,053,071 B2 | 5/2006 | Dawson et al. | |
| 2006/0008486 A1 | 1/2006 | Lewis | |
| 2010/0099777 A1 | 4/2010 | Devisetty et al. | |
| 2018/0168169 A1 | 6/2018 | Ugalde Martinez et al. | |

FOREIGN PATENT DOCUMENTS

| | | |
|---|---|---|
| EP | 0517569 A1 | 12/1992 |
| EP | 2946673 A1 | 1/2007 |
| EP | 2047749 A2 | 4/2009 |
| EP | 1845786 B1 | 3/2010 |
| EP | 2684456 A1 | 1/2012 |
| ES | 2206887 T3 | 5/2004 |
| ES | 2344416 T3 | 8/2010 |
| FR | 2828064 A1 | 2/2003 |
| FR | 2917947 A1 | 1/2009 |
| WO | W00024259 | 5/2000 |
| WO | W02005058364 A2 | 6/2005 |

(Continued)

OTHER PUBLICATIONS

European Office Action dated Feb. 22, 2016 pertaining to European Application No. 12761378.4.

(Continued)

*Primary Examiner* — Susan Hoffman

(74) *Attorney, Agent, or Firm* — Dinsmore & Shohl LLP

(57) ABSTRACT

The present invention relates to phytosanitary compositions with fungicidal properties that comprise one essential oil obtained from plants selected from oregano oil (*Origanum vulgare*) and thyme oil (*Thymus vulgaris*) or its active compounds carvacrol at a concentration between 0.1 and 530 ppm or thymol at a concentration between 0.31 and 530 ppm, or a combination thereof; and (2) potassium carbonate at a concentration between 3.5 and 25 mM, and an agent with known fungicidal properties for use, principally, in contact-protection against fungal infections in cultivated plants and post-harvest, and also in other antifungal applications. In said compositions, the effect of the agents that have known fungicidal properties is potentiated synergistically by the aforementioned essential oils.

7 Claims, No Drawings

(56) References Cited

FOREIGN PATENT DOCUMENTS

| WO | W02007090714 A1 | 8/2007 |
|---|---|---|
| WO | W02011119049 A1 | 9/2011 |

OTHER PUBLICATIONS

Indian Examination Report dated Jul. 13, 2018 pertaining to Indian Application No. 6709/DELNP/2013.
"For Outdoor Use Only", Dec. 31, 2004, XP055250457, retrieved from the Internet: URL:http://s3-us-west-1.amazonaws.com/www.agrian.com/pdfs/Rose_Pharm_(1-28-08)_Label.pdf [retrieved on Feb. 16, 2016].
Kaamil-al-Sena'ah, Part II (10th century AD), Central Council for Research in Unani Medicine, 61-65 Institutional Area, Janak Puri, New Delhi-58, 2005 AD.
Al-Qaanoon-fil-Tibb, vol. V (11th century AD), Publication Department, Jamia Hamdard, New Delhi-62, 1996 AD.
Kitaab-al-Haawi-fil-Tibb, vol. IX (9th century AD), Dayerah-al-Ma'aarif Usmania, Hyderabad, (First Edition) 1960 AD.
European Search Report dated Jul. 1, 2014 for European Application No. 12761378.4.
Chinese Office Action dated Jun. 23, 2014 for Chinese Application No. 2012800106414.
Li et al., Food Science and Technology, 2007, No. 1, pp. 185-188.
International Search Report dated May 7, 2012 for PCT/ES2012/070005 Filed Jan. 5, 2012.
Methanol Systemic Agent, https:/lwww.cdc.gov/nioshlershdb/emergencyresponsecard_29750029.html Accessed: Nov. 3, 2017.
"Making "K" Pay in your Vineyard: Dripping Potassium Carbonate into the System"; Joe Traynor Beesource Beekeeping (Feb. 2011), Accessed from: https://web.archive.org/web/2011 0203080649/htlp://beesource.com/point-of-view/joe-traynor/making-k-pay-in-your-vineyard-<lripping-potassium-carbonate-into-the-system.
Nematicidal Activity of Cassia and Cinnamon Oil Compounds and Related Compounds toward Bursaphelenchus xylophilus (Nematoda: Parasitaphelenchidae), Kong et al., Journal of Nematology (2007) vol. 39, No. 1, pp. 31-36.
"Characterization of antioxidant and antimicrobial compounds of cinnamon and ginger essential oils", El-Baroty et al., African Journal of Biochemistry Research (2010), vol. 4, No. 6, pp. 167-174.
"Bioactivity of two major constituents isolated from the essential oil of *Artemisia judaica* L.", Abdelgaleil et al., Bioresource Technology (2008), vol. 99, pp. 5947-5950.
"Sodium", http://www.chemistryexplained.com/elements/P-T/Sodium.html Accessed: Dec. 2, 2016.
"Potassium Carbonate", Evonik Industries AG; GPS Safety Summry K2C03 Mar. 2014; Version 2.
"A comparison of chemical, antioxidant and antimicrobial studies of cinnamon leaf and bark volatile oils, oleoresins and their constituents", Sing et al., Food and Chemical Toxicology (2007), vol. 45; pp. 1650-1661.
Chemical composition and antifungal activity of rosemary (*Rosmarinus officinalis* L.) oil from Turkey., Ozcan et al., International Journal of Food Sciences and Nutrition (2008), vol. 59, No. 7-8, pp. 691-698.
"Natural products in crop protection" Dayan et al., Bioorganic & Medicinal Chemistry (2009), vol. 17, pp. 4022-4034.
"Copper as a Biocidal Tool", Borkow et al., Current Medicinal Chemistry (2005), vol. 12, pp. 2163-2175.
"The Phenolic Hydroxyl Group of Carvacrol Is Essential for Action against the Food-Borne pthogen Bacillus cereus", Ultee et al., Applied and Environmental Microbiology (2002), vol. 68, No. 4, pp. 1561-1568.
Election/Restriction dated Apr. 13, 2016 for U.S. Appl. No. 13/982,181, filed Jul. 26, 2013.
Non-Final Office Action dated Jun. 21, 2016 for U.S. Appl. No. 13/982,181, filed Jul. 26, 2013.
Final Office Action dated Dec. 7, 2016 for U.S. Appl. No. 13/982,181, filed Jul. 26, 2013.
Non-Final Office Action dated Feb. 16, 2017 for U.S. Appl. No. 13/982,181, filed Jul. 26, 2013.
Election/Restriction dated Nov. 8, 2017 for U.S. Appl. No. 13/982,181, filed Jul. 26, 2013.
European Search Report for European Application No. 18157571.3 dated Apr. 17, 2018.
Ahmad, A. et al., Fungicidal activity of thymol and carvacrol by disrupting ergosterol biosynthesis and membrane integrity against Candida, European Journal of Clinical Microbiology & Infectious Diseases, 30(1): 41-50, 2011.
Arfa, A. et al., Antimicrobial activity of carvacrol related to its chemical structure, Letters in Applied Microbiology, 43(2): 149-154, Aug. 2006.
Nigro, F. et al., Control of table grape storage rots by pre-harvest applications of salts, Postharvest Biology and Technology, 42: 142-149, 2006.
Palmer, C. et al., Use of Bicarbonates to Inhibit in vitro Colony Growth of Botryis cinerea, Plant Disease, 81(12): 1432-1438, Dec. 1997.

* cited by examiner

PHYTOSANITARY COMPOSITION COMPRISING ESSENTIAL OILS THAT POTENTIATE ANTIFUNGAL ACTIVITY

CROSS-REFERENCE TO RELATED APPLICATIONS

This application is a continuation in part of U.S. patent application Ser. No. 15/890,484, filed Feb. 7, 2018, which is a divisional application of U.S. patent application Ser. No. 13/982,181 filed Jul. 26, 2013, which is a U.S. National Stage Application of PCT/ES2012/070005 filed Jan. 5, 2012, which claims benefit to Spanish Patent Application No. 201130390 filed Mar. 18, 2011, the contents of these applications being incorporated herein by reference in their entirety.

DESCRIPTION

This invention relates to phytosanitary compositions having fungicidal properties comprising a mixture of essential oils obtained from plants, such as thyme oil (*Thymus vulgaris*) and oregano oil (*Origanum vulgare*) or mixtures thereof, and an agent having known fungicidal properties such as potassium carbonate, for use mainly in contact protection against fungicidal infections in cultivated plants and post-harvesting, and in other antifungal applications. In these compositions the effect of the agent having known fungicidal properties is synergistically potentiated by the essential oils mentioned.

Essential oils are complex mixtures of natural molecules which are fundamentally obtained from plants. They are secondary metabolites which can normally be obtained by extraction with organic solvents and subsequent concentration, or by physical treatments with steam followed by separation of the water-insoluble phase. Generally they are volatile liquids soluble in organic solvents and have a density lower than that of water.

In nature they can be synthesized in different plant organs such as seeds, leaves, flowers, epidermal cells and fruits, among others, and they play an important part in protecting plants against bacterial, viral or fungal infections.

The fungicidal and bactericidal action of many plant essential oils is known, and has arrived in some case to be marketed commercially. Among these are jojoba oil (*Simmondsia californica*), rosemary oil (*Rosmarinus officinalis*), thyme oil (*T. vulgaris*), the clarified hydrophobic extract of neem oil (*A. indica*), cottonseed oil (*Gossypium hirsutum*) with garlic extract (Dayan et al., Bioorg. and Med. Chem. 2009; 17:4022-34).

The chemical composition of essential oils differs not only in the quantity but also in the quality and the stereochemical type of the molecules in the extracted substances. The extraction product may vary according to climate, the composition of the soil, the organ of the plant used for extraction, and the age and stage of growth of the plant. It also depends on the extraction process used.

Furthermore, Zamani et al. showed that the potassium carbonate was effective as fungicide treatment against *Penicillium digitatum* in green mold on oranges (Commun. Agric. Appl. Biol. Sci. 2007; 72(4):773-7). The Patent CN107041366 discloses the use of potassium carbonate which is applied together with pesticides (including fungicides), improving the emulsification and impregnation.

Because of their natural origin plant essential oils are very attractive for application in agriculture in order to obtain healthy and harmless products, as this is a requirement which has been made increasingly strictly, by both consumers and regulatory authorities.

There is therefore a need to find new phytosanitary compositions having antifungal properties to protect crops, including during post-harvesting, which have a minimum of secondary toxic effects and which are harmless to human beings and the environment.

The present authors have surprisingly found that some essential oils obtained from plants when mixed with other products having known antifungal properties potentiate the antifungal properties of these compounds, such as inorganic salts, for example alkali metal carbonates like potassium carbonate.

Thus one object of the present invention is to provide a phytosanitary composition having antifungal activity comprising: (1) one essential oil obtained from plants selected from oregano oil (*Origanum vulgare*) and thyme oil (*Thymus vulgaris*) or its active compounds carvacrol at a concentration between 0.1 and 530 ppm or thymol at a concentration between 0.31 and 530 ppm, or a combination thereof; and (2) potassium carbonate at a concentration between 3.5 and 25 mM.

This composition synergistically improves the antifungal properties of the agents having known antifungal activity, has a minimum of secondary toxic effects and is harmless to human beings and the environment.

The composition according to this invention may be applied in agriculture to protect crops from the stage of germination to harvesting, and during the storage and transport of these crops, seeds, flowers or grains. Likewise, another possible application is in the elimination of fungi which attack painted surfaces and to protect carpets and fabrics in the home and in any other application against fungal attack through contact.

Among the essential oils which may be used in the phytosanitary composition according to this invention are thyme oil (*Thymus vulgaris*) and oregano oil (*Origanum vulgare*) or mixtures thereof.

Without being bound to any theory in particular, it is possible that the property of the essential oils obtained from plants in potentiating antifungal activity is due to some of the compounds present in these essential oils having known activity. Thus in one embodiment of this invention the phytosanitary composition may comprise one or a mixture of active compounds isolated from the essential oils according to this invention, such as phenolic monoterpenoids such as carvacrol and thymol, and mixtures thereof, and an agent having known fungicidal properties, such as potassium carbonate. The mechanism of action of the essential oils is a multiple one due to the complex mixture of different active ingredients which they contain. However, the nature of the action of the major components in some of these oils has been described. The best described in the literature is the nature of the action of carvacrol on the growth of bacterial and yeast cells (Ultee et al., Appl. Environ. Microbiol. 2002; 68(4):1561-68). According to these studies carvacrol is capable of crossing the cell membrane when it is protonated (in acid medium) and on reaching the cytoplasm releases a proton, resulting in acidification of the cell. This manner of action does not rule out other possible modes of action such as increase in the permeability of the membrane or specific inhibiting effects on catalytic processes. Moreover, the Patent CN104642326 describes a fungicidal composition containing penflufen and carvacrol. PCT application WO2014036667 discloses a continuous extraction method to produce a high content of carvacrol and thymol, which are powerful fungicides.

On the other hand, some studies showed that the essential oil of *Thymus vulgaris*, the thyme oil, has a moderate control efficacy against *Aspergillus niger* strains with its antifungal activity resulting mainly due to killing of microorganism rather than growth inhibition. Oils on wheat seeds showed no significant phytotoxic effect in terms of seed germination or seedling growth (Kumar et al., Environ. Sci. Pollut. Res. Int. 2017; 24(27):21948-59). Other important evidence is that an in vivo antifungal assay demonstrated that the maximum antifungal activity was showed by thyme oil against *Penicillium expansum* and *Botrytis cinerea* in pear fruits (Nikkhah et al., Int. J. Food Microbiol. 2017; 18(257): 285-94). Furthermore, the U.S. Ser. No. 09/492,490 patent describes a composition for controlling a target pest comprising 0.1% to 4% isopropyl myristate, 0.1% to 15% thyme oil white, 0.1% to 2% geraniol, and at least one additional active ingredient. The PCT WO2014153042 discloses a method for treating *Mycosphaerella fijiensis* in crops of the Musaceae family by applying a fungicidal composition comprising garlic oil, rosemary oil, thyme oil and cinnamon oil.

Among the agents having known fungicidal properties which may be used in the composition according to the invention there are the carbonates of alkali metals, preferably of lithium, sodium or potassium. More preferably the agent having known fungicidal properties is potassium carbonate.

The concentration of thymol present in the composition according to this invention is between 0.31 and 530 ppm, preferably between 22 and 350 ppm. The concentration of carvacrol present in the composition according to this invention is between 0.1 and 530 ppm, preferably between 22 and 310 ppm. Also the concentration of the potassium carbonate having known fungicidal properties in the composition according to this invention may vary between 3.5 and 25 mM preferably between 10 and 25 mM.

The composition according to this invention may be prepared by mixing the essential oil or oils and the agent having fungicidal properties through any method of mixing known in the art. However, the composition may also be in solid or liquid form, such as a suspension, dispersion, emulsion, spray, microencapsulate or any other type of mixture which remains stable over time or may be incorporated in polymers, waxes or any other similar supports.

Furthermore, the phytosanitary composition according to this invention may be used as such, or may be used to formulate a phytosanitary product together with different additives used in the art which offer different properties, such as surfactants, polymers, alkanising agents, pH-control agents, among many other additives used in the formulation of products used in the agricultural industry.

The phytosanitary composition according to this invention falls within the group of contact phytosanitary agents that is the form of the protection against fungal diseases is through contact, given that the composition remains on the surface of different parts of the plant, protecting it externally against the external attack of fungi.

Being a liquid, a powder or a microencapsulate, the phytosanitary composition according to this invention can be applied by any method of application known in the art, such as spraying.

The fungicidal composition according to this invention may further comprise a fertiliser, which may be selected from the group comprising compounds containing nitrogen and/or phosphorus such as urea, melamine, hexamine, dicyanodiamide, ameline, cyanuric acid, melamine nitrate, triethyl phosphite and the like or mixtures thereof.

The composition according to this invention may also comprise any compound or product having chemical and/or biological activity used in agriculture, such as herbicides, insecticides, plant growth regulators and the like, or mixtures thereof.

This invention is described below in greater detail with reference to various examples. However, these examples are not intended to restrict the technical scope of this invention.

EXAMPLES

Example 1. Inhibition of Growth of the Fungus *Botrytis cinerea* by $K_2CO_3$ Alone The fungus *B. cinerea* was cultured in PDB (potato dextrose broth) medium with different concentrations of $K_2CO_3$. The % inhibition, representing the extent to which growth was impeded in comparison with a control which did not have the compound(s) under test, was calculated in the following way:

$$\% \text{ Inhibition} = \frac{OD(\text{control}) - OD(x)}{OD(\text{control})} \times 100$$

where "OD(control)" is the optical density of the control culture (without test compounds) and "OD(x)" is the optical density of the culture with the test substance(s). The optical density of the liquid culture was measured 24 hours after the start of culturing and the results are shown in Table I.

TABLE I

| Inhibition of the growth of *B. cinerea* by $K_2CO_3$ | | | | | |
|---|---|---|---|---|---|
| $K_2CO_3$ concentration (mM) | 0 | 3.5 | 4.25 | 4.5 | 5 |
| Inhibition ± SD (%) | 0 | 48.2 ± 2.3 | 53.3 ± 2.4 | 67.2 ± 1.9 | 71.0 ± 1.6 |

As will be seen from the table above, with a $K_2CO_3$ concentration between 3.5 and 5 mM inhibition of the *B. cinerea* culture was observed.

Example 2. Inhibition of Growth of the Fungus *Botrytis cinerea* by Carvacrol

The fungus *B. cinerea* was cultured in PDB medium with different concentrations of carvacrol. The % inhibition was calculated as Example 1.

The optical density of the liquid culture was measured 24 hours after the start of culturing and the results are shown in Table II.

TABLE II

| Inhibition of the growth of *B. cinerea* by carvacrol | | | | | | | |
|---|---|---|---|---|---|---|---|
| Carvacrol concentration (ppm) | 0.1 | 0.31 | 1 | 3.1 | 10 | 31 | 100 |
| Inhibition ± SD (%) | 0 | 10.5 ± 7.7 | 13.7 ± 4.1 | 22.4 ± 3.4 | 21.3 ± 5.0 | 51.4 ± 5.5 | 74.4 ± 1.1 |

Example 3. Inhibition of the Fungus *Botrytis cinerea* by the Composition According to this Invention ($K_2CO_3$+Carvacrol)

The fungus *B. cinerea* was cultured in a similar way to Example 1 with the difference that different concentrations of carvacrol were used in the medium and that a constant concentration of $K_2CO_3$ (3.5 mM) was used throughout. The 24 hour optical density of the culture was measured and the results are shown in Table III.

TABLE III

Inhibition of *B. cinerea* by the composition according to this invention ($K_2CO_3$ + Carvacrol)

| | | | | | | | |
|---|---|---|---|---|---|---|---|
| $K_2CO_3$ concentration (mM) | 3.5 | 3.5 | 3.5 | 3.5 | 3.5 | 3.5 | 3.5 |
| Carvacrol concentration (ppm) | 0.1 | 0.31 | 1 | 3.1 | 10 | 31 | 100 |
| Inhibition ± SD (%) | 50.2 ± 3.0 | 58.8 ± 2.2 | 65.7 ± 2.7 | 82.4 ± 1.9 | 88.0 ± 1.5 | 100 ± 0 | 100 ± 0 |

It will be seen how the results are improved by adding carvacrol to $K_2CO_3$. With 10 ppm of carvacrol (see in Table II) only 21% inhibition is achieved, and with 3.5 mM of $K_2CO_3$ 48% inhibition is achieved. However, when the two compounds are combined inhibition of growth of the fungus *B. cinerea* is increased up to 88%.

Example 4. Inhibition of Growth of the Fungus *Botrytis cinerea* by Thymol Alone The fungus *B. cinerea* was cultured in a similar way to Example 1 with different concentrations of thymol. The 24 hour optical density of the culture was measured and the results are shown in Table IV.

TABLE IV

Inhibition of the growth of *B. cinerea* by Thymol

| | | | | | | |
|---|---|---|---|---|---|---|
| Thymol concentration (ppm) | 0.31 | 1 | 3.1 | 10 | 31 | 100 |
| Inhibition ± SD (%) | 0 ± 0 | 2.1 ± 2.9 | 10.7 ± 2.3 | 12.6 ± 2.4 | 32.0 ± 1.7 | 88.2 ± 0.6 |

Example 5. Inhibition of the Fungus *Botrytis cinerea* by the Composition According to this Invention ($K_2CO_3$+Thymol)

The fungus *B. cinerea* was cultured in a similar way to Example 1 with the difference that different concentrations of thymol were used in the medium and that a constant concentration of $K_2CO_3$ (3.5 mM) was used throughout. The 24 hour optical density of the culture was measured and the results are shown in Table V.

TABLE V

Inhibition of *B. cinerea* by the composition according to this invention ($K_2CO_3$ + Thymol)

| | | | | | | |
|---|---|---|---|---|---|---|
| $K_2CO_3$ concentration (mM) | 3.5 | 3.5 | 3.5 | 3.5 | 3.5 | 3.5 |
| Thymol concentration (ppm) | 0.31 | 1 | 3.1 | 10 | 31 | 100 |
| Inhibition ± SD (%) | 49.4 ± 2.1 | 62.1 ± 2.2 | 73.2 ± 1.1 | 81.0 ± 1.6 | 93.0 ± 1.1 | 100 ± 0 |

It will be seen how the results are improved by adding thymol to $K_2CO_3$. With 10 ppm of thymol only 13% inhibition is achieved, and with 3.5 mM of $K_2CO_3$ 48% inhibition is achieved. However, when the two compounds are combined inhibition of growth of the fungus *B. cinerea* is increased up to some 81%.

Example 6. Inhibition of Growth of the Fungus *Alternaria alternata* by $K_2CO_3$ Alone

*Alternaria alternata* was cultured in a similar way to Example 1 with different concentrations of $K_2CO_3$. The 24 hour optical density of the culture was measured and the results are shown in Table VI.

TABLE VI

Inhibition of the growth of *A. alternata* by $K_2CO_3$

| $K_2CO_3$ concentration (mM) | 0 | 3.5 | 4.25 | 4.5 | 5 |
|---|---|---|---|---|---|
| Inhibition ± SD (%) | 0 | 31.5 ± 2.5 | 39.7 ± 2.5 | 48.0 ± 2.2 | 59.0 ± 2.2 |

As will be seen from the table above, with a $K_2CO_3$ concentration between 3.5 and 5 mM inhibition of the *A. alternata* culture was observed.

Example 7. Inhibition of Growth of the Fungus *Alternaria alternata* by Carvacrol The fungus *A. alternata* was cultured in PDB medium with different concentrations of carvacrol. The % inhibition was calculated as Example 1 and the results are shown in Table VII.

TABLE VII

Inhibition of the growth of *A. alternata* by carvacrol

| Carvacrol concentration (ppm) | 0.1 | 0.31 | 1 | 3.1 | 10 | 31 | 100 |
|---|---|---|---|---|---|---|---|
| Inhibition ± SD (%) | 0 | 2.0 ± 0.3 | 3.5 ± 0.8 | 5.8 ± 1.4 | 17.7 ± 11.0 | 27.2 ± 14.0 | 74.6 ± 8.0 |

Example 8. Inhibition of the Fungus *Alternaria alternata* by the Composition According to this Invention ($K_2CO_3$+Carvacrol)

The fungus *A. alternata* was cultured in a similar way to Example 1 with the difference that different concentrations of carvacrol were used in the medium and that a constant concentration of $K_2CO_3$ (3.5 mM) was used throughout. The 24 hour optical density of the culture was measured and the results are shown in Table VIII.

TABLE VIII

Inhibition of *A. alternata* by the composition according to this invention ($K_2CO_3$ + Carvacrol)

| $K_2CO_3$ concentration (mM) | 3.5 | 3.5 | 3.5 | 3.5 | 3.5 | 3.5 | 3.5 |
|---|---|---|---|---|---|---|---|
| Carvacrol concentration (ppm) | 0.1 | 0.31 | 1 | 3.1 | 10 | 31 | 100 |
| Inhibition ± SD (%) | 30.1 ± 2.9 | 35.7 ± 2.7 | 38.0 ± 2.9 | 46.2 ± 2.9 | 65.7 ± 1.6 | 86.3 ± 1.2 | 100 ± 0 |

It will be seen how the results are improved by adding carvacrol to $K_2CO_3$. With 31 ppm of carvacrol (see Table VII) only 27% inhibition is achieved, and with 3.5 mM of $K_2CO_3$ 32% inhibition is achieved. However, when the two compounds are combined inhibition of growth of the fungus *A. alternata* is increased up to some 86%.

Example 9. Inhibition of Growth of the Fungus *Alternaria alternata* by Thymol Alone The fungus *A. alternata* was cultured in a similar way to Example 1 with different concentrations of thymol. The 24 hour optical density of the culture was measured and the results are shown in Table IX.

TABLE IX

Inhibition of the growth of *A. alternata* by Thymol

| Thymol concentration (ppm) | 0.31 | 1 | 3.1 | 10 | 31 | 100 |
|---|---|---|---|---|---|---|
| Inhibition ± SD (%) | 0 ± 0 | 4.1 ± 2.9 | 10.4 ± 2.6 | 16.0 ± 2.0 | 29.0 ± 1.5 | 69.4 ± 0 |

Example 10. Inhibition of the Fungus *Alternaria alternata* by the Composition According to this Invention ($K_2CO_3$+Thymol)

The fungus *A. alternata* was cultured in a similar way to Example 1 with the difference that different concentrations of thymol were used in the medium and that a constant concentration of $K_2CO_3$ (3.5 mM) was used throughout. The 24 hour optical density of the culture was measured and the results are shown in Table X.

TABLE X

Inhibition of *A. alternata* by the composition according to this invention ($K_2CO_3$ + Thymol)

| $K_2CO_3$ concentration (mM) | 3.5 | 3.5 | 3.5 | 3.5 | 3.5 | 3.5 |
|---|---|---|---|---|---|---|
| Thymol concentration (ppm) | 0.31 | 1 | 3.1 | 10 | 31 | 100 |
| Inhibition ± SD (%) | 33.7 ± 2.2 | 38.7 ± 2.7 | 45.3 ± 2.4 | 55.5 ± 1.2 | 71.8 ± 1.3 | 100 ± 0 |

It will be seen how the results are improved by adding thymol to $K_2CO_3$. With 31 ppm of thymol only 29% inhibition is achieved, and with 3.5 mM of $K_2CO_3$ 32% inhibition is achieved. However, when the two compounds are combined inhibition of growth of the fungus *A. alternata* is increased up to some 72%.

Example 11. Inhibition of Growth of the Fungus *Penicillium digitatum* by $K_2CO_3$ Alone

*Penicillium digitatum* was cultured in a similar way to Example 1 with different concentrations of $K_2CO_3$. The 24 hour optical density of the culture was measured and the results are shown in Table XI.

TABLE XI

Inhibition of the growth of *P. digitatum* by $K_2CO_3$

| $K_2CO_3$ concentration (mM) | 0 | 3.5 | 4.25 | 4.5 | 5 |
|---|---|---|---|---|---|
| Inhibition ± SD (%) | 0 | 29.1 ± 2.1 | 33.0 ± 1.7 | 36.9 ± 1.6 | 39.5 ± 1.8 |

As will be seen from the table above, with a $K_2CO_3$ concentration between 3.5 and 5 mM inhibition of the *P. digitatum* culture was observed.

Example 12. Inhibition of Growth of the Fungus *Penicillium digitatum* by Carvacrol Alone The fungus *P. digitatum* was cultured in a similar way to Example 1 with different concentrations of carvacrol. The 24 hour optical density of the culture was measured and the results are shown in Table XII.

TABLE XII

Inhibition of the growth of *P. digitatum* by Carvacrol

| Carvacrol concentration (ppm) | 0.1 | 0.31 | 1 | 3.1 | 10 | 31 | 100 |
|---|---|---|---|---|---|---|---|
| Inhibition ± SD (%) | 32.3 ± 2.8 | 34.3 ± 2.8 | 37.9 ± 3.0 | 52.6 ± 2.2 | 57.8 ± 2.1 | 86.0 ± 1.1 | 100 ± 0 |

Example 13. Inhibition of the Fungus *Penicillium digitatum* by the Composition According to this Invention ($K_2CO_3$+Carvacrol)

The fungus *P. digitatum* was cultured in a similar way to Example 1 with the difference that different concentrations of carvacrol were used in the medium and that a constant concentration of $K_2CO_3$ (3.5 mM) was used throughout. The 24 hour optical density of the culture was measured and the results are shown in Table XIII.

TABLE XIII

Inhibition of *P. digitatum* by the composition according to this invention ($K_2CO_3$ + Carvacrol)

| | | | | | | | |
|---|---|---|---|---|---|---|---|
| $K_2CO_3$ concentration (mM) | 3.5 | 3.5 | 3.5 | 3.5 | 3.5 | 3.5 | 3.5 |
| Carvacrol concentration (ppm) | 0.1 | 0.31 | 1 | 3.1 | 10 | 31 | 100 |
| Inhibition ± SD (%) | 65.9 ± 2.4 | 66.2 ± 2.9 | 72.4 ± 2.2 | 88.6 ± 1.9 | 96.5 ± 1.4 | 100 ± 0 | 100 ± 0 |

It will be seen how the results are improved by adding carvacrol to $K_2CO_3$. With 10 ppm of carvacrol 58% inhibition is achieved, and with 3.5 mM of $K_2CO_3$ 29% inhibition is achieved. However, when the two compounds are combined inhibition of growth of the fungus *P. digitatum* is increased up to 97%.

Example 14. Inhibition of Growth of the Fungus *Penicillium digitatum* by Thymol Alone The fungus *P. digitatum* was cultured in a similar way to Example 1 with different concentrations of thymol. The 24 hour optical density of the culture was measured and the results are shown in Table XIV.

TABLE XIV

Inhibition of the growth of *P. digitatum* by Thymol

| | | | | | | | |
|---|---|---|---|---|---|---|---|
| Thymol concentration (ppm) | 0.31 | 1 | 3.1 | 10 | 31 | 100 | 100 |
| Inhibition ± SD (%) | 28.2 ± 3.9 | 24.2 ± 6.0 | 36.3 ± 2.3 | 36.2 ± 2.0 | 50.7 ± 2.0 | 78.3 ± 2.2 | 95.6 ± 0.5 |

Example 15. Inhibition of the Fungus *Penicillium digitatum* by the Composition According to this Invention ($K_2CO_3$+Thymol)

The fungus *P. digitatum* was cultured in a similar way to Example 1 with the difference that different concentrations of thymol were used in the medium and that a constant concentration of $K_2CO_3$ (3.5 mM) was used throughout. The 24 hour optical density of the culture was measured and the results are shown in Table XV.

TABLE XV

Inhibition of *P. digitatum* by the composition according to this invention ($K_2CO_3$ + Thymol)

| | | | | | | |
|---|---|---|---|---|---|---|
| $K_2CO_3$ concentration (mM) | 3.5 | 3.5 | 3.5 | 3.5 | 3.5 | 3.5 |
| Thymol concentration (ppm) | 0.31 | 1 | 3.1 | 10 | 31 | 100 |
| Inhibition ± SD (%) | 58.1 ± 2.9 | 61.3 ± 2.5 | 69.9 ± 1.9 | 78.3 ± 1.5 | 94.3 ± 1.2 | 100 ± 0 |

It will be seen how the results are improved by adding thymol to $K_2CO_3$. With 31 ppm of thymol (see Table XIV) only 51% inhibition is achieved, and with 3.5 mM of $K_2CO_3$ 29% inhibition is achieved. However, when the two compounds are combined inhibition of growth of the fungus *P. digitatum* is increased up to some 94%.

Example 16. Inhibition of Growth of the Fungus *Cercospora beticola* by $K_2CO_3$ Alone

*Cercospora beticola* was cultured on PDA (potato dextrose agar) culture medium buffered to a pH value not exceeding 9.5. The inhibition degree, expressed as a percentage, was determined based on the growth relative to control that did not have the compound(s) to be tested. The % inhibition was calculated with the following formula:

$$\% \text{ Inhibition} = \frac{\text{colony diameter(control)} - \text{colony diameter}(x)}{\text{colony diameter(control)}} \times 100$$

wherein "colony diameter (control)" is the size of the control colony (without the compounds to be tested) and "colony diameter (x)" is the size of the colony with the substance(s) to be tested. A fixed $K_2CO_3$ concentration of 7.24 mM was tested in *C. beticola*. The results are shown in Table XVI.

TABLE XVI

| Inhibition of the growth of C. beticola by $K_2CO_3$ alone | |
|---|---|
| $K_2CO_3$ concentration (mM) | 7.24 |
| Inhibition ± SD (%) | 25.0 ± 1.2 |

Example 17. Inhibition of Growth of the Fungus Cercospora beticola by Carvacrol Alone The fungus *C. beticola* was cultured in a similar way to Example 16 with 10 ppm of carvacrol. The % inhibition was calculated and the results are shown in Table XVII.

TABLE XVII

| Inhibition of the growth of C. beticola by carvacrol alone | |
|---|---|
| Carvacrol concentration (ppm) | 10 |
| Inhibition ± SD (%) | 17.0 ± 0.8 |

Example 18. Inhibition of Growth of the Fungus Cercospora beticola by the Composition According to this Invention ($K_2CO_3$+Carvacrol)

The fungus *C. beticola* was cultured in a similar way to Example 16 with a fixed concentration of $K_2CO_3$ (7.24 mM) and carvacrol (10 ppm). The % inhibition was calculated and the results are shown in Table XVIII.

TABLE XVIII

| Inhibition of the growth of C. beticola by the composition according to this invention ($K_2CO_3$ + Carvacrol) | |
|---|---|
| $K_2CO_3$ concentration (mM) | 7.24 |
| Carvacrol concentration (ppm) | 10 |
| Inhibition ± SD (%) | 65.0 ± 3.2 |

It will be seen how the results are improved by adding carvacrol to $K_2CO_3$. With 10 ppm of carvacrol (see Table XVII) only 17% inhibition is achieved, and with 7.24 mM of $K_2CO_3$ 25% inhibition is achieved. However, when the two compounds are combined inhibition of growth of the fungus *C. beticola* is increased up to some 65%.

Example 19. Inhibition of the Fungus Botrytis cinerea by $K_2CO_3$ Alone

Leaves of tomato plants (var. Marmande) of 5 weeks old were treated with different concentrations of $K_2CO_3$, and 24 hours later, they were infected with the fungus *Botrytis cinerea*. Two weeks later, fungal infection was assessed in leaves. The % inhibition, representing the extent to which fungal growth was impeded in comparison with a control which did not have the compound(s) under test, was determined in the following way:

$$\% \text{ Inhibition} = \frac{\% \text{ Infection(control)} - \% \text{ Infection}(x)}{\% \text{ Infection(control)}} \times 100$$

where "% Infection (control)" is the percentage of fungal infection of the control leaves (without test compounds) and "% Infection (x)" is percentage of fungal infection of the treated leaves. The results are shown in Table XIX.

TABLE XIX

| Inhibition of the growth of B. cinerea by $K_2CO_3$ alone | | | | | |
|---|---|---|---|---|---|
| $K_2CO_3$ concentration (mM) | 12 | 13 | 14 | 15 | 22 |
| Inhibition ± SD (%) | 13.4 ± 2.5 | 13.5 ± 2.1 | 13.8 ± 2.3 | 13.8 ± 3.0 | 15.3 ± 2.4 |

Example 20. Inhibition of the Fungus Botrytis cinerea by Carvacrol Alone

Leaves of tomato plants treated with different concentrations of carvacrol were infected with the fungus *B. cinerea* in a similar way to Example 19. The % inhibition was calculated and the results are shown in Table XX.

TABLE XX

| Inhibition of the growth of B. cinerea by Carvacrol alone | | | | | |
|---|---|---|---|---|---|
| Carvacrol concentration (ppm) | 26 | 31 | 100 | 200 | 308 |
| Inhibition ± SD (%) | 7.2 ± 1.1 | 7.4 ± 1.3 | 16.7 ± 2.1 | 18.6 ± 2.3 | 20.8 ± 2.3 |

Example 21. Inhibition of Growth of the Fungus Botrytis cinerea by the Composition According to this Invention ($K_2CO_3$+Carvacrol)

Leaves of tomato plants treated with different concentrations of carvacrol and carvacrol were infected with the fungus *B. cinerea* in a similar way to Example 19. The % inhibition was calculated and the results are shown in Table XXI.

TABLE XXI

| Inhibition of the growth of B. cinerea by the composition according to this invention ($K_2CO_3$ + Carvacrol) | | | | | |
|---|---|---|---|---|---|
| $K_2CO_3$ concentration (mM) | 14 | 22 | 15 | 15 | 13 |
| Carvacrol concentration (ppm) | 26 | 31 | 100 | 200 | 308 |
| Inhibition ± SD (%) | 24.3 ± 2.1 | 28.1 ± 2.8 | 48.3 ± 2.8 | 60.0 ± 2.6 | 72.8 ± 2.4 |

It will be seen how the results are improved by adding carvacrol to $K_2CO_3$. With 308 ppm of carvacrol (see Table XX) only 21% inhibition is achieved, and with 13 mM of $K_2CO_3$ 14% inhibition is achieved. However, when the two compounds are combined inhibition of growth of the fungus *B. cinerea* is increased up to some 73%.

Example 22. Inhibition of the Fungus Botrytis cinerea by Thymol Alone

Leaves of tomato plants treated with different concentrations of thymol were infected with the fungus *B. cinerea* in a similar way to Example 19. The % inhibition was calculated and the results are shown in Table XXII.

TABLE XXII

| Inhibition of the growth of B. cinerea by Thymol alone | | | | |
|---|---|---|---|---|
| Thymol concentration (ppm) | 35 | 100 | 200 | 350 |
| Inhibition ± SD (%) | 7.4 ± 1.3 | 17.7 ± 1.7 | 20.9 ± 1.5 | 22.8 ± 1.5 |

Example 23. Inhibition of Growth of the Fungus *Botrytis cinerea* by the Composition According to this Invention ($K_2CO_3$+Thymol)

Leaves of tomato plants treated with different concentrations of thymol and $K_2CO_3$ were infected with the fungus *B. cinerea* in a similar way to Example 19. The % inhibition was calculated and the results are shown in Table XXIII.

TABLE XXIII

| Inhibition of the growth of B. cinerea by the composition according to this invention ($K_2CO_3$ + Thymol) | | | | |
|---|---|---|---|---|
| $K_2CO_3$ concentration (mM) | 15 | 15 | 15 | 12 |
| Thymol concentration (ppm) | 35 | 100 | 200 | 350 |
| Inhibition ± SD (%) | 25.6 ± 2.6 | 40.8 ± 2.4 | 53.5 ± 2.3 | 65.0 ± 2.2 |

It will be seen how the results are improved by adding thymol to $K_2CO_3$. With 350 ppm of thymol (see Table XXII) only 23% inhibition is achieved, and with 12 mM of $K_2CO_3$ 14% inhibition is achieved. However, when the two compounds are combined inhibition of growth of the fungus *B. cinerea* is increased up to some 65%.

Example 24. Inhibition of the Fungus *Alternaria alternata* by $K_2CO_3$ Alone

Leaves of tomato plants treated with different concentrations of $K_2CO_3$ were infected with the fungus *A. alternata* in a similar way to Example 19. The % inhibition was calculated and the results are shown in Table XXIV.

TABLE XXIV

| Inhibition of the growth of A. alternata by $K_2CO_3$ alone | | | | | |
|---|---|---|---|---|---|
| $K_2CO_3$ concentration (mM) | 12 | 13 | 14 | 15 | 22 |
| Inhibition ± SD (%) | 6.5 ± 2.2 | 7.0 ± 1.1 | 7.2 ± 1.1 | 7.8 ± 1.4 | 8.6 ± 1.5 |

Example 25. Inhibition of the Fungus *Alternaria alternata* by Carvacrol Alone

Leaves of tomato plants treated with different concentrations of carvacrol were infected with the fungus *A. alternata* in a similar way to Example 19. The % inhibition was calculated and the results are shown in Table XXV.

TABLE XXV

| Inhibition of the growth of A. alternata by Carvacrol alone | | | | | |
|---|---|---|---|---|---|
| Carvacrol concentration (ppm) | 26 | 31 | 100 | 200 | 308 |
| Inhibition ± SD (%) | 4.3 ± 0.7 | 5.8 ± 0.9 | 11.4 ± 1.3 | 16.1 ± 1.2 | 18.4 ± 1.2 |

Example 26. Inhibition of Growth of the Fungus *Alternaria alternata* by the Composition According to this Invention ($K_2CO_3$+Carvacrol)

Leaves of tomato plants treated with different concentrations of carvacrol and $K_2CO_3$ were infected with the fungus *B. cinerea* in a similar way to Example 19. The % inhibition was calculated and the results are shown in Table XXVI.

TABLE XXVI

| Inhibition of the growth of A. alternata by the composition according to this invention ($K_2CO_3$ + Carvacrol) | | | | | |
|---|---|---|---|---|---|
| $K_2CO_3$ concentration (mM) | 14 | 22 | 15 | 15 | 13 |
| Carvacrol concentration (ppm) | 26 | 31 | 100 | 200 | 308 |
| Inhibition ± SD (%) | 18.4 ± 2.1 | 17.3 ± 2.4 | 43.9 ± 3.2 | 60.9 ± 2.8 | 70.8 ± 3.5 |

It will be seen how the results are improved by adding carvacrol to $K_2CO_3$. With 308 ppm of carvacrol (see Table XXV) only 18% inhibition is achieved, and with 13 mM of $K_2CO_3$ 7% inhibition is achieved. However, when the two compounds are combined inhibition of growth of the fungus *A. alternata* is increased up to some 71%.

Example 27. Inhibition of the Fungus *Alternaria alternata* by Thymol Alone

Leaves of tomato plants treated with different concentrations of thymol were infected with the fungus *A. alternata* in a similar way to Example 19. The % inhibition was calculated and the results are shown in Table XXVII.

TABLE XXVII

| Inhibition of the growth of A. alternata by Thymol alone | | | | |
|---|---|---|---|---|
| Thymol concentration (ppm) | 35 | 100 | 200 | 350 |
| Inhibition ± SD (%) | 10.0 ± 1.4 | 15.2 ± 2.0 | 19.3 ± 2.3 | 21.3 ± 2.6 |

Example 28. Inhibition of Growth of the Fungus *Alternaria alternata* by the Composition According to this Invention ($K_2CO_3$+Thymol)

Leaves of tomato plants treated with different concentrations of thymol and $K_2CO_3$ were infected with the fungus *A. alternata* in a similar way to Example 19. The % inhibition was calculated and the results are shown in Table XXVIII.

TABLE XXVIII

| Inhibition of the growth of A. alternata by the composition according to this invention ($K_2CO_3$ + Thymol) | | | | |
|---|---|---|---|---|
| $K_2CO_3$ concentration (mM) | 15 | 15 | 15 | 12 |
| Thymol concentration (ppm) | 35 | 100 | 200 | 350 |
| Inhibition ± SD (%) | 22.4 ± 2.5 | 37.3 ± 2.9 | 53.7 ± 2.0 | 60.8 ± 2.2 |

It will be seen how the results are improved by adding thymol to $K_2CO_3$. With 350 ppm of thymol (see Table XXVII) only 21% inhibition is achieved, and with 12 mM of $K_2CO_3$ 7% inhibition is achieved. However, when the two compounds are combined inhibition of growth of the fungus *A. alternata* is increased up to some 61%.

Example 29. Inhibition of the Fungus *Phytophthora infestans* by K$_2$CO$_3$ Alone Tomato plants (var. Marmande) of 5 weeks old were treated with 15 mM of K$_2$CO$_3$, and 24 hours later, they were infected with the fungus *Phytophthora infestans*. Two weeks later, fungal infection was assessed in leaves. The % inhibition, representing the extent to which growth was impeded in comparison with a control which did not have the compounds under test, was determined in the following way:

$$\% \text{ Inhibition} = \frac{\% \text{ Infection(control)} - \% \text{ Infection}(x)}{\% \text{ Infection(control)}} \times 100$$

where "% Infection (control)" is the percentage of fungal infection of the control plants (without test compound) and "% Infection (x)" is percentage of fungal infection of the treated plants. The results are shown in Table XXIX.

TABLE XXIX

| Inhibition of the growth of *P. infestans* by K$_2$CO$_3$ alone | |
|---|---|
| K$_2$CO$_3$ concentration (mM) | 15 |
| Inhibition ± SD (%) | 18.5 ± 3.6 |

Example 30. Inhibition of the Fungus *Phytophthora infestans* by Carvacrol Alone Tomato plants were treated with different concentrations of carvacrol and subsequently infected with the fungus *P. infestans* in a similar way to Example 29. The % inhibition was calculated and the results are shown in Table XXX.

TABLE XXX

| Inhibition of the growth of *P. infestans* by Carvacrol alone | | | |
|---|---|---|---|
| Carvacrol concentration (ppm) | 26 | 150 | 308 |
| Inhibition ± SD (%) | 3.2 ± 0.8 | 17.1 ± 2.3 | 35.0 ± 4.8 |

Example 31. Inhibition of Growth of the Fungus *Phytophthora infestans* by the Composition According to this Invention (K$_2$CO$_3$+Carvacrol)

Tomato plants were treated with different concentrations of carvacrol and a fixed concentration of K$_2$CO$_3$ and subsequently infected with the fungus *P. infestans* in a similar way to Example 29. The % inhibition was calculated and the results are shown in Table XXXI.

TABLE XXXI

| Inhibition of the growth of *P. infestans* by the composition according to this invention (K$_2$CO$_3$ + Carvacrol) | | | |
|---|---|---|---|
| K$_2$CO$_3$ concentration (mM) | 15 | 15 | 15 |
| Carvacrol concentration (ppm) | 26 | 150 | 308 |
| Inhibition ± SD (%) | 25.6 ± 3.6 | 52.2 ± 4.2 | 78.3 ± 4.8 |

It will be seen how the results are improved by adding carvacrol to K$_2$CO$_3$. With 308 ppm of carvacrol (see Table XXX) only 35% inhibition is achieved, and with 15 mM of K$_2$CO$_3$ 19% inhibition is achieved. However, when the two compounds are combined inhibition of growth of the fungus *P. infestans* is increased up to some 78%.

Example 32. Inhibition of the Fungus *Phytophthora infestans* by Thymol Alone Tomato plants were treated with different concentrations of thymol and subsequently infected with the fungus *P. infestans* in a similar way to Example 29. The % inhibition was calculated and the results are shown in Table XXXII.

TABLE XXXII

| Inhibition of the growth of *P. infestans* by Thymol alone | | | |
|---|---|---|---|
| Thymol concentration (ppm) | 35 | 150 | 350 |
| Inhibition ± SD (%) | 4.3 ± 0.7 | 16.2 ± 3.2 | 33.6 ± 5.6 |

Example 33. Inhibition of Growth of the Fungus *Phytophthora infestans* by the Composition According to this Invention (K$_2$CO$_3$+Thymol)

Tomato plants were treated with different concentrations of thymol and a fixed concentration of K$_2$CO$_3$ and subsequently infected with the fungus *P. infestans* in a similar way to Example 29. The % inhibition was calculated and the results are shown in Table XXXIII.

TABLE XXXIII

| Inhibition of the growth of *P. infestans* by the composition according to this invention (K$_2$CO$_3$ + Thymol) | | | |
|---|---|---|---|
| K$_2$CO$_3$ concentration (mM) | 15 | 15 | 15 |
| Thymol concentration (ppm) | 35 | 150 | 350 |
| Inhibition ± SD (%) | 26.3 ± 2.2 | 49.3 ± 3.6 | 74.2 ± 5.2 |

It will be seen how the results are improved by adding thymol to K$_2$CO$_3$. With 350 ppm of thymol (see Table XXXII) only 34% inhibition is achieved, and with 15 mM of K$_2$CO$_3$ 19% inhibition is achieved. However, when the two compounds are combined inhibition of growth of the fungus *P. infestans* is increased up to some 74%.

Example 34. Inhibition of the Fungus *Leveillula Taurica* by K$_2$CO$_3$ Alone The fungus *L. taurica* was cultured in a similar way to Example 29 with different concentrations of K$_2$CO$_3$. The % inhibition was calculated and the results are shown in Table XXXIV.

TABLE XXXIV

| Inhibition of the growth of *L. taurica* by K$_2$CO$_3$ alone | |
|---|---|
| K$_2$CO$_3$ concentration (mM) | 15 |
| Inhibition ± SD (%) | 13.9 ± 0.5 |

Example 35. Inhibition of the Fungus *Leveillula Taurica* by Carvacrol Alone Tomato plants were treated with different concentrations of carvacrol and subsequently infected with the fungus *L. taurica* in a similar way to Example 29. The % inhibition was calculated and the results are shown in Table XXXV.

TABLE XXXV

Inhibition of the growth of *L. taurica* by Carvacrol alone.

| Carvacrol concentration (ppm) | 26 | 150 | 308 |
|---|---|---|---|
| Inhibition ± SD (%) | 4.0 ± 1.2 | 11.2 ± 1.0 | 41.5 ± 1.2 |

Example 36. Inhibition of Growth of the Fungus *Leveillula Taurica* by the Composition According to this Invention ($K_2CO_3$+Carvacrol)

Tomato plants were treated with different concentrations of carvacrol and a fixed concentration of $K_2CO_3$ and subsequently infected with the fungus *L. taurica* in a similar way to Example 29. The % inhibition was calculated and the results are shown in Table XXXVI.

TABLE XXXVI

Inhibition of the growth of *L. taurica* by the composition according to this invention ($K_2CO_3$ + Carvacrol)

| $K_2CO_3$ concentration (mM) | 15 | 15 | 15 |
|---|---|---|---|
| Carvacrol concentration (ppm) | 26 | 150 | 308 |
| Inhibition ± SD (%) | 18.6 ± 3.3 | 78.3 ± 0.6 | 92.0 ± 0 |

It will be seen how the results are improved by adding carvacrol to $K_2CO_3$. With 308 ppm of carvacrol (see Table XXXV) only 42% inhibition is achieved, and with 15 mM of $K_2CO_3$ 14% inhibition is achieved. However, when the two compounds are combined inhibition of growth of the fungus *L. taurica* is increased up to some 92%.

Example 37. Inhibition of the Fungus *Leveillula Taurica* by Thymol Alone

Tomato plants were treated with different concentrations of thymol and subsequently infected with the fungus *L. taurica* in a similar way to Example 29. The % inhibition was calculated and the results are shown in Table XXXVII.

TABLE XXXVII

Inhibition of the growth of *L. taurica* by Thymol alone.

| Thymol concentration (ppm) | 35 | 150 | 350 |
|---|---|---|---|
| Inhibition ± SD (%) | 10.5 ± 5.4 | 38.2 ± 5.5 | 51.2 ± 1.0 |

Example 38. Inhibition of Growth of the Fungus *Leveillula Taurica* by the Composition According to this Invention ($K_2CO_3$+Thymol)

Tomato plants were treated with different concentrations of thymol and a fixed concentration of $K_2CO_3$ and subsequently infected with the fungus *L. taurica* in a similar way to Example 29. The % inhibition was calculated and the results are shown in Table XXX VIII.

TABLE XXXVIII

Inhibition of the growth of *L. taurica* by the composition according to this invention ($K_2CO_3$ + Thymol)

| $K_2CO_3$ concentration (mM) | 15 | 15 | 15 |
|---|---|---|---|
| Thymol concentration (ppm) | 35 | 150 | 350 |
| Inhibition ± SD (%) | 48.8 ± 3.1 | 65.4 ± 2.4 | 72.9 ± 1.1 |

It will be seen how the results are improved by adding thymol to $K_2CO_3$. With 350 ppm of thymol (see Table XXXVII) only 51% inhibition is achieved, and with 15 mM of $K_2CO_3$ 14% inhibition is achieved. However, when the two compounds are combined inhibition of growth of the fungus *P. infestans* is increased up to some 73%.

Example 39. Inhibition of the Fungus *Pseudoperonospora cubensis* by the Composition According to this Invention ($K_2CO_3$+Carvacrol)

The efficacy of the composition of the present invention ($K_2CO_3$+carvacrol or thymol) was tested in field assays with cucumber, tomato, lettuce or potato plants to prevent *Pseudoperonospora cubensis, Botrytis cinerea, Phytophthora infestans* or *Leveillula taurica* growth. The efficacy of the fungicide was measured as follow:

$$\% \text{ Efficacy} = \frac{\% \text{ Severity(control)} - \% \text{ Severity}(x)}{\% \text{ Severity(control)}} \times 100$$

where "% Severity (control)" is the percentage of fungal severity of the control plants (without test compounds) and "% Severity (x)" is percentage of fungal severity of the treated plants. Cucumber plants were treated with different concentrations of $K_2CO_3$ and carvacrol and subsequently infected with *Pseudoperonospora cubensis*. The results are shown in Table XXXIX.

TABLE XXXIX

Efficacy of *Pseudoperonospora cubensis* by the composition according to this invention ($K_2CO_3$ + Carvacrol) in cucumber

| $K_2CO_3$ concentration (mM) | 13.5 | 19 | 6.5 | 13.0 | 22.4 |
|---|---|---|---|---|---|
| Carvacrol concentration (ppm) | 25.5 | 36.5 | 150 | 300 | 530 |
| Inhibition ± SD (%) | 16.7 ± 3.3 | 26.7 ± 4.2 | 35.5 ± 3.9 | 45.3 ± 5.3 | 64.2 ± 7.3 |

The efficacy of the inhibition of growth of the fungus *P. cubensis* reached 64% by combining $K_2CO_3$ and carvacrol.

Example 40. Inhibition of the Fungus *Pseudoperonospora cubensis* by the Composition According to this Invention ($K_2CO_3$+Thymol)

The efficacy of the composition of the present invention ($K_2CO_3$+Thymol) was tested in cucumber to prevent *P. cubensis* growth. The efficacy of the antifungicide was measured and the results are shown in Table XL.

TABLE XL

Efficacy of *Pseudoperonospora cubensis* by the composition according to this invention ($K_2CO_3$ + Thymol) in cucumber

| $K_2CO_3$ concentration (mM) | 6.5 | 13.0 | 22.4 |
|---|---|---|---|
| Thymol concentration (ppm) | 150 | 300 | 530 |
| Inhibition ± SD (%) | 31.6 ± 4.6 | 41.1 ± 6.1 | 53.3 ± 7.0 |

The efficacy of the inhibition of growth of the fungus *P. cubensis* reached 53% by combining $K_2CO_3$ and thymol.

Example 41. Inhibition of the Fungus *Botrytis cinerea* by the Composition According to this Invention ($K_2CO_3$+Carvacrol)

The efficacy of the composition of the present invention ($K_2CO_3$+Carvacrol) was tested in tomato to prevent *B.* cinerea growth. The efficacy of the antifungicide was measured and the results are shown in Table XLI.

TABLE XLI

Efficacy of Botrytis cinerea by the composition according to this invention ($K_2CO_3$ + Carvacrol) in tomato

| $K_2CO_3$ concentration (mM) | 13.5 | 19 | 6.5 | 13.0 | 22.4 |
|---|---|---|---|---|---|
| Carvacrol concentration (ppm) | 25.5 | 36.5 | 150 | 300 | 530 |
| Inhibition ± SD (%) | 21.7 ± 4.4 | 27.8 ± 4.1 | 38.5 ± 5.6 | 69.8 ± 8.3 | 78.3 ± 6.5 |

The efficacy of the inhibition of growth of the fungus *B. cinerea* reached 78% by combining $K_2CO_3$ and carvacrol.

Example 42. Inhibition of the Fungus *Botrytis cinerea* by the Composition According to this Invention ($K_2CO_3$+Thymol)

The efficacy of the composition of the present invention ($K_2CO_3$+Thymol) was tested in tomato to prevent *B. cinerea* growth. The efficacy of the antifungicide was measured and the results are shown in Table XLII.

TABLE XLII

Efficacy of Botrytis cinerea by the composition according to this invention ($K_2CO_3$ + Thymol) in tomato

| $K_2CO_3$ concentration (mM) | 6.5 | 13.0 | 22.4 |
|---|---|---|---|
| Thymol concentration (ppm) | 150 | 300 | 530 |
| Inhibition ± SD (%) | 35.8 ± 4.3 | 58.0 ± 4.6 | 66.0 ± 6.0 |

The efficacy of the inhibition of growth of the fungus *B. cinerea* reached 66% by combining $K_2CO_3$ and thymol.

Example 43. Inhibition of the Fungus *Phytophthora infestans* by the Composition According to this Invention ($K_2CO_3$+Carvacrol)

The efficacy of the composition of the present invention ($K_2CO_3$+Carvacrol) was tested in lettuce to prevent *P. infestans* growth. The efficacy of the antifungicide was measured and the results are shown in Table XLIII.

TABLE XLIII

Efficacy of P. infestans by the composition according to this invention ($K_2CO_3$ + Carvacrol) in lettuce

| $K_2CO_3$ concentration (mM) | 5.4 | 12.6 | 21.6 |
|---|---|---|---|
| Carvacrol concentration (ppm) | 132 | 309 | 529 |
| Inhibition ± SD (%) | 58.0 ± 2.4 | 72.1 ± 5.2 | 80.3 ± 4.3 |

The efficacy of the inhibition of growth of the fungus *P. infestans* reached 80% by combining $K_2CO_3$ and carvacrol.

Example 44. Inhibition of the Fungus *Phytophthora infestans* by the Composition According to this Invention ($K_2CO_3$+Carvacrol)

The efficacy of the composition of the present invention ($K_2CO_3$+Carvacrol) was tested in potato to prevent *P. infestans* growth. The efficacy of the antifungicide was measured and the results are shown in Table XLIV.

TABLE XLIV

Efficacy of P. infestans by the composition according to this invention ($K_2CO_3$ + Carvacrol) in potato

| $K_2CO_3$ concentration (mM) | 5.4 | 12.6 | 21.6 |
|---|---|---|---|
| Carvacrol concentration (ppm) | 132 | 309 | 529 |
| Inhibition ± SD (%) | 68.6 ± 2.9 | 71.7 ± 3.4 | 86.7 ± 4.1 |

The efficacy of the inhibition of growth of the fungus *P. infestans* reached 87% by combining $K_2CO_3$ and carvacrol.

Example 45. Inhibition of the Fungus *Leveilulla Taurica* by the Composition According to this Invention ($K_2CO_3$+Carvacrol)

The efficacy of the composition of the present invention ($K_2CO_3$+Carvacrol) was tested in tomato to prevent *L. taurica* growth. The efficacy of the antifungicide was measured and the results are shown in Table XLV.

TABLE XLV

Efficacy of L. taurica by the composition according to this invention ($K_2CO_3$ + Carvacrol) in tomato

| $K_2CO_3$ concentration (mM) | 5.7 | 13.2 | 24.5 | 5.4 | 12.6 | 21.6 |
|---|---|---|---|---|---|---|
| Carvacrol concentration (ppm) | 11.0 | 25.6 | 47.5 | 132 | 309 | 529 |
| Inhibition ± SD (%) | 22.0 ± 3.1 | 53.0 ± 4.4 | 61.0 ± 3.9 | 43.0 ± 4.2 | 58.0 ± 5.2 | 71.0 ± 3.8 |

The efficacy of the inhibition of growth of the fungus *L. taurica* reached 71% by combining $K_2CO_3$ and carvacrol.

What is claimed is:

1. A phytosanitary composition having antifungal activity comprising: (1) a thyme (*Thymus vulgaris*) essential oil obtained from plants comprising its active compound thymol which is present at a concentration between 0.31 and 530 ppm in the phytosanitary composition; and (2) potassium carbonate at a concentration between 3.5 and 25 mM.

2. A phytosanitary composition according to claim 1, characterised in that the thymol is at a concentration between 22 and 350 ppm.

3. A phytosanitary composition according to claim 1, characterised in that the potassium carbonate is at a concentration between 10 and 25 mM.

4. A phytosanitary composition according to claim 1, characterised in that the composition is in liquid or solid form which remains stable over time or is incorporated in a support.

5. A phytosanitary composition according to claim 1, characterised in that the phytosanitary composition is formulated together with additives.

6. A phytosanitary composition according to claim 1, which further comprises a fertiliser selected from the group consisting of compounds containing nitrogen and/or phosphorus and a mixture thereof.

7. A phytosanitary composition according to claim 1, which further comprises a compound or product having chemical and/or biological activity used in agriculture.

* * * * *